(Model.)
J. B. STOCKHAM.
Pulley.
No. 228,415. Patented June 1, 1880.
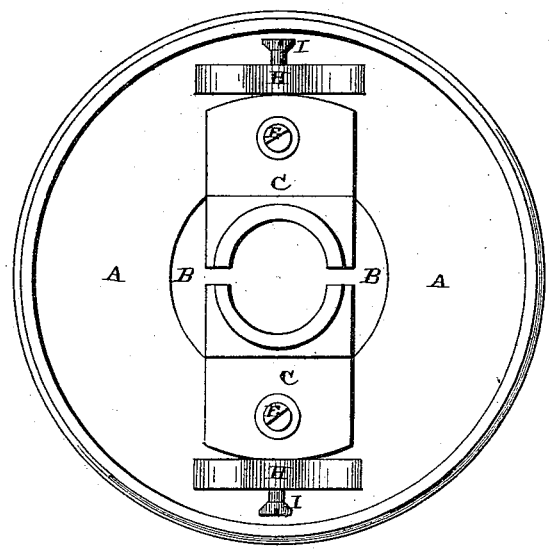
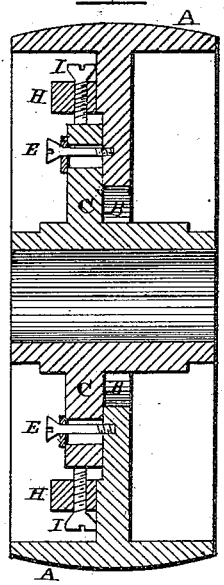
Witnesses:
Wm W Mortimer
C. H. Isham
Inventor:
J. B. Stockham,
per
F. A. Lehmann,
Atty.

UNITED STATES PATENT OFFICE.

JEROME B. STOCKHAM, OF JACKSON, MICHIGAN.

PULLEY.

SPECIFICATION forming part of Letters Patent No. 228,415, dated June 1, 1880,

Application filed May 1, 1880. (Model.)

*To all whom it may concern:*

Be it known that I, JEROME B. STOCKHAM, of Jackson, in the county of Jackson and State of Michigan, have invented certain new and useful Improvements in Pulleys; and I do hereby declare the following to be a full, clear, and exact description of the invention, such as will enable others skilled in the art to which it pertains to make and use it, reference being had to the accompanying drawings, which form part of this specification.

My invention relates to an improvement in pulleys; and it consists in providing a pulley which is made in a single piece and provided with an opening through its center much larger than the shaft with an adjustable box or bearing, which box or bearing can be made to fit shafts of different sizes, as will be more fully described hereinafter.

The object of my invention is not only to provide a pulley with means for adapting it to shafts of different sizes, but to enable all wear, either of the shaft or of the boxing, to be taken up, and thus prevent any wabbling or unsteady motion on the part of the pulley.

Figure 1 is a side elevation of my invention. Fig. 2 is a vertical cross-section of the same.

A represents a band-pulley of any suitable construction, which has an opening, B, through its center, and which is much larger than the shaft to which the pulley is to be attached. To one side of this pulley, on opposite sides of this hole, are secured, by means of set-screws, the halves C of the box or bearing, by means of which the pulley is to be fastened to the shaft. Each one of these halves has a longitudinal slot made through it, and passed through this slot is a set-screw, clamping-bolt, or other suitable device, E, by means of which each part may be held in position. This screw or clamping device, together with a recess formed in the side of the central portion of the pulley, serves rather as a guide for making each part move in a straight line and to keep it always straight than to secure it rigidly to the side of the pulley, though these set-screws may be used for that purpose. For the purpose of adjusting these two halves of the box inwardly toward each other, so as to not only secure them to shafts of different sizes, but to take up the wear both in the shaft and in the box or bearing itself, there is secured to the side of the pulley, just beyond the outer end of each half, a suitable ear or projection, H, through which is passed a set-screw, I. By turning these set-screws, which have their inner ends to press against the outer ends of the two parts of the box or bearing, each half or either one alone can be moved inward so as to clasp the shaft more tightly.

By thus making the two parts of the box adjustable, whenever the shaft or the bearing itself has become worn, so that there is an uneven movement in the pulley as it revolves, a single turn of either one of the set-screws I will tighten the box or bearing in such a manner as to stop this unsteady motion at once.

This improvement is suitable for pulleys of all kinds, and enables every pulley having the boxes thus made adjustable to be used either as a fast or a loose pulley, as may be desired.

Having thus described my invention, I claim—

1. A pulley made in a single piece and having a hole through its center much larger than the shaft to which the pulley is to be attached, in combination with a box or bearing made in halves, and which box or bearing is made adjustable, substantially as shown.

2. The combination of a shaft having an opening, B, through its center, with a box or bearing made in two parts, and slotted so that either one or both can be moved inward toward or outward from the shaft, and the set-screws for holding each part in position, substantially as described.

3. The combination of a pulley having an opening through its center larger than the shaft to which it is to be attached, an adjustable box or bearing made in two parts, and provided with set-screws for holding the parts to the side of the pulley, and the set-screws for moving the parts of the box or bearing inward, substantially as set forth.

In testimony that I claim the foregoing I have hereunto set my hand this 24th day of April, 1880.

JEROME B. STOCKHAM.

Witnesses:
LYMAN M. LEWIS,
JNO. G. MUNDY.